(12) United States Patent
Chandrasekaran

(10) Patent No.: US 9,019,061 B2
(45) Date of Patent: Apr. 28, 2015

(54) MAGNETIC DEVICE FORMED WITH U-SHAPED CORE PIECES AND POWER CONVERTER EMPLOYING THE SAME

(75) Inventor: Sriram Chandrasekaran, Dallas, TX (US)

(73) Assignee: Power Systems Technologies, Ltd., Ebene (MU)

( * ) Notice: Subject to any disclaimer, the term of this patent is extended or adjusted under 35 U.S.C. 154(b) by 873 days.

(21) Appl. No.: 12/751,650

(22) Filed: Mar. 31, 2010

(65) Prior Publication Data
US 2010/0254168 A1 Oct. 7, 2010

Related U.S. Application Data

(60) Provisional application No. 61/165,184, filed on Mar. 31, 2009.

(51) Int. Cl.
| | | |
|---|---|---|
| H01F 27/24 | (2006.01) | |
| H01F 27/28 | (2006.01) | |
| H01F 17/06 | (2006.01) | |
| H01F 7/06 | (2006.01) | |
| H01F 3/10 | (2006.01) | |
| H01F 30/06 | (2006.01) | |
| H01F 37/00 | (2006.01) | |
| H01F 41/02 | (2006.01) | |
| H02M 1/42 | (2007.01) | |

(Continued)

(52) U.S. Cl.
CPC .. *H01F 3/10* (2013.01); *H01F 3/12* (2013.01); *H01F 3/14* (2013.01); *H01F 27/263* (2013.01); *H01F 30/06* (2013.01); *H01F 37/00* (2013.01); *H01F 41/02* (2013.01); *H01F 2038/026* (2013.01); *H02M 1/4208* (2013.01); *H02M 3/1582* (2013.01); *H02M 2003/1586* (2013.01); *Y02B 70/126* (2013.01)

(58) Field of Classification Search
USPC ......... 336/212, 220–222, 170, 233, 184, 178; 29/602.1, 605, 606
See application file for complete search history.

(56) References Cited

U.S. PATENT DOCUMENTS

| | | |
|---|---|---|
| 1,376,978 A | 5/1921 | Stoekle |
| 2,473,662 A | 6/1949 | Pohm |

(Continued)

FOREIGN PATENT DOCUMENTS

| | | |
|---|---|---|
| CN | 1735948 A | 2/2006 |
| CN | 101141099 | 3/2008 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner* — Mangtin Lian
(74) *Attorney, Agent, or Firm* — Boisbrun Hofman, PLLC

(57) ABSTRACT

A magnetic device formed with U-shaped core pieces employable in a power converter, and a method of forming the same. In one embodiment, the magnetic device includes a rectilinear core piece formed of a magnetic material, and first and second U-shaped core pieces positioned on the rectilinear core piece. The magnetic device also includes first and second conductive windings formed about the first and second U-shaped core pieces, respectively.

20 Claims, 9 Drawing Sheets

(51) Int. Cl.
    *H01F 3/12*         (2006.01)
    *H01F 3/14*         (2006.01)
    *H01F 27/26*       (2006.01)
    *H01F 38/02*       (2006.01)
    *H02M 3/158*      (2006.01)

(56) References Cited

U.S. PATENT DOCUMENTS

| | | | |
|---|---|---|---|
| 3,007,060 | A | 10/1961 | Guenther |
| 3,142,809 | A | 7/1964 | Remenyik |
| 3,346,798 | A | 10/1967 | Dinger |
| 3,358,210 | A | 12/1967 | Grossoehme |
| 3,433,998 | A | 3/1969 | Woelber |
| 3,484,562 | A | 12/1969 | Kronfeld |
| 3,546,571 | A | 12/1970 | Fletcher et al. |
| 3,553,620 | A | 1/1971 | Cielo et al. |
| 3,602,795 | A | 8/1971 | Gunn |
| 3,622,868 | A | 11/1971 | Todt |
| 3,659,191 | A * | 4/1972 | Spreadbury ............ 323/248 |
| 3,681,679 | A | 8/1972 | Chung |
| 3,708,742 | A | 1/1973 | Gunn |
| 3,708,744 | A | 1/1973 | Stephens et al. |
| 4,019,122 | A | 4/1977 | Ryan |
| 4,075,547 | A | 2/1978 | Wroblewski |
| 4,202,031 | A | 5/1980 | Hesler et al. |
| 4,257,087 | A | 3/1981 | Cuk |
| 4,274,071 | A | 6/1981 | Pfarre |
| 4,327,348 | A | 4/1982 | Hirayama |
| 4,393,157 | A * | 7/1983 | Roberge et al. ........... 323/355 |
| 4,471,423 | A | 9/1984 | Hase |
| 4,499,481 | A | 2/1985 | Greene |
| 4,570,174 | A | 2/1986 | Huang et al. |
| 4,577,268 | A | 3/1986 | Easter et al. |
| 4,581,691 | A | 4/1986 | Hock |
| 4,613,841 | A | 9/1986 | Roberts |
| 4,636,823 | A | 1/1987 | Margalit et al. |
| 4,660,136 | A | 4/1987 | Montorefano |
| 4,770,667 | A | 9/1988 | Evans et al. |
| 4,770,668 | A | 9/1988 | Skoultchi et al. |
| 4,785,387 | A | 11/1988 | Lee et al. |
| 4,799,138 | A | 1/1989 | Chahabadi et al. |
| 4,803,609 | A | 2/1989 | Gillett et al. |
| 4,823,249 | A | 4/1989 | Garcia, II |
| 4,837,496 | A | 6/1989 | Erdi |
| 4,853,668 | A | 8/1989 | Bloom |
| 4,866,367 | A | 9/1989 | Ridley et al. |
| 4,876,638 | A | 10/1989 | Silva et al. |
| 4,887,061 | A | 12/1989 | Matsumura |
| 4,899,271 | A | 2/1990 | Seiersen |
| 4,903,089 | A | 2/1990 | Hollis et al. |
| 4,922,400 | A | 5/1990 | Cook |
| 4,962,354 | A | 10/1990 | Visser et al. |
| 4,964,028 | A | 10/1990 | Spataro |
| 4,999,759 | A | 3/1991 | Cavagnolo et al. |
| 5,003,277 | A | 3/1991 | Sokai et al. |
| 5,027,264 | A | 6/1991 | DeDoncker et al. |
| 5,068,756 | A | 11/1991 | Morris et al. |
| 5,106,778 | A | 4/1992 | Hollis et al. |
| 5,126,714 | A | 6/1992 | Johnson |
| 5,132,888 | A | 7/1992 | Lo et al. |
| 5,134,771 | A | 8/1992 | Lee et al. |
| 5,172,309 | A | 12/1992 | DeDoncker et al. |
| 5,177,460 | A | 1/1993 | Dhyanchand et al. |
| 5,182,535 | A | 1/1993 | Dhyanchand |
| 5,204,809 | A | 4/1993 | Andresen |
| 5,206,621 | A | 4/1993 | Yerman |
| 5,208,739 | A | 5/1993 | Sturgeon |
| 5,223,449 | A | 6/1993 | Morris et al. |
| 5,225,971 | A | 7/1993 | Spreen |
| 5,231,037 | A | 7/1993 | Yuan et al. |
| 5,244,829 | A | 9/1993 | Kim |
| 5,262,930 | A | 11/1993 | Hua et al. |
| 5,282,126 | A | 1/1994 | Husgen |
| 5,285,396 | A | 2/1994 | Aoyama |
| 5,291,382 | A | 3/1994 | Cohen |
| 5,303,138 | A | 4/1994 | Rozman |
| 5,305,191 | A | 4/1994 | Loftus, Jr. |
| 5,335,163 | A * | 8/1994 | Seiersen ............ 363/126 |
| 5,336,985 | A | 8/1994 | McKenzie |
| 5,342,795 | A | 8/1994 | Yuan et al. |
| 5,343,140 | A | 8/1994 | Gegner |
| 5,353,001 | A | 10/1994 | Meinel et al. |
| 5,369,042 | A | 11/1994 | Morris et al. |
| 5,374,887 | A | 12/1994 | Drobnik |
| 5,399,968 | A | 3/1995 | Sheppard et al. |
| 5,407,842 | A | 4/1995 | Morris et al. |
| 5,450,307 | A | 9/1995 | Yasumura |
| 5,459,652 | A | 10/1995 | Faulk |
| 5,461,555 | A | 10/1995 | Kitajima et al. |
| 5,468,661 | A | 11/1995 | Yuan et al. |
| 5,477,175 | A | 12/1995 | Tisinger et al. |
| 5,508,903 | A | 4/1996 | Alexndrov |
| 5,523,673 | A | 6/1996 | Ratliff et al. |
| 5,539,630 | A | 7/1996 | Pietkiewicz et al. |
| 5,554,561 | A | 9/1996 | Plumton |
| 5,555,494 | A | 9/1996 | Morris |
| 5,572,079 | A * | 11/1996 | Pinkerton ............ 310/90.5 |
| 5,581,224 | A * | 12/1996 | Yamaguchi ............ 336/212 |
| 5,610,085 | A | 3/1997 | Yuan et al. |
| 5,624,860 | A | 4/1997 | Plumton et al. |
| 5,663,876 | A | 9/1997 | Newton et al. |
| 5,700,703 | A | 12/1997 | Huang et al. |
| 5,712,189 | A | 1/1998 | Plumton et al. |
| 5,719,544 | A | 2/1998 | Vinciarelli et al. |
| 5,731,666 | A * | 3/1998 | Folker et al. ............ 315/276 |
| 5,734,564 | A | 3/1998 | Brkovic |
| 5,736,842 | A | 4/1998 | Jovanovic |
| 5,742,491 | A | 4/1998 | Bowman et al. |
| 5,747,842 | A | 5/1998 | Plumton |
| 5,756,375 | A | 5/1998 | Celii et al. |
| 5,760,671 | A | 6/1998 | Lahr et al. |
| 5,783,984 | A | 7/1998 | Keuneke |
| 5,784,266 | A | 7/1998 | Chen |
| 5,804,943 | A | 9/1998 | Kollman et al. |
| 5,815,383 | A | 9/1998 | Lei |
| 5,815,386 | A | 9/1998 | Gordon |
| 5,864,110 | A | 1/1999 | Moriguchi et al. |
| 5,870,299 | A | 2/1999 | Rozman |
| 5,880,942 | A | 3/1999 | Leu |
| 5,886,508 | A | 3/1999 | Jutras |
| 5,889,298 | A | 3/1999 | Plumton et al. |
| 5,889,373 | A * | 3/1999 | Fisher et al. ............ 315/307 |
| 5,889,660 | A | 3/1999 | Taranowski et al. |
| 5,900,822 | A | 5/1999 | Sand et al. |
| 5,907,231 | A | 5/1999 | Watanabe et al. |
| 5,907,481 | A | 5/1999 | Svärdsjö |
| 5,909,110 | A | 6/1999 | Yuan et al. |
| 5,910,665 | A | 6/1999 | Plumton et al. |
| 5,920,475 | A | 7/1999 | Boylan et al. |
| 5,925,088 | A | 7/1999 | Nasu |
| 5,929,665 | A | 7/1999 | Ichikawa et al. |
| 5,933,338 | A | 8/1999 | Wallace |
| 5,940,287 | A | 8/1999 | Brkovic |
| 5,946,207 | A | 8/1999 | Schoofs |
| 5,956,245 | A | 9/1999 | Rozman |
| 5,956,578 | A | 9/1999 | Weitzel et al. |
| 5,959,850 | A | 9/1999 | Lim |
| 5,977,853 | A | 11/1999 | Ooi et al. |
| 5,999,066 | A | 12/1999 | Saito et al. |
| 5,999,429 | A | 12/1999 | Brown |
| 6,003,139 | A | 12/1999 | McKenzie |
| 6,008,519 | A | 12/1999 | Yuan et al. |
| 6,011,703 | A | 1/2000 | Boylan et al. |
| 6,038,154 | A | 3/2000 | Boylan et al. |
| 6,046,664 | A | 4/2000 | Weller et al. |
| 6,055,166 | A | 4/2000 | Jacobs |
| 6,060,943 | A | 5/2000 | Jansen |
| 6,067,237 | A | 5/2000 | Nguyen |
| 6,069,798 | A | 5/2000 | Liu |
| 6,069,799 | A | 5/2000 | Bowman et al. |
| 6,078,510 | A | 6/2000 | Spampinato et al. |
| 6,084,792 | A | 7/2000 | Chen et al. |
| 6,094,038 | A | 7/2000 | Lethellier |
| 6,097,046 | A | 8/2000 | Plumton |

(56) References Cited

U.S. PATENT DOCUMENTS

| | | |
|---|---|---|
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,400,579 B2 | 6/2002 | Cuk |
| 6,414,578 B1 | 7/2002 | Jitaru |
| 6,438,009 B2 | 8/2002 | Assow |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,563,725 B2 | 5/2003 | Carsten |
| 6,570,268 B1 | 5/2003 | Perry et al. |
| 6,580,627 B2 | 6/2003 | Toshio |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim et al. |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,295,092 B2 * | 11/2007 | Elliott et al. .................. 336/178 |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 * | 2/2008 | Iwai .............................. 336/170 |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,443,274 B2 * | 10/2008 | Lee et al. .................. 336/84 M |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |

(56) References Cited

U.S. PATENT DOCUMENTS

| | | |
|---|---|---|
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |
| 8,179,699 B2 | 5/2012 | Tumminaro et al. |
| 2002/0057080 A1 | 5/2002 | Telefus et al. |
| 2002/0114172 A1 | 8/2002 | Webb et al. |
| 2002/0167385 A1* | 11/2002 | Ackermann ............... 336/178 |
| 2003/0026115 A1 | 2/2003 | Miyazaki |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0034555 A1 | 2/2004 | Dismukes et al. |
| 2004/0148047 A1 | 7/2004 | Dismukes et al. |
| 2004/0156220 A1 | 8/2004 | Kim et al. |
| 2004/0200631 A1 | 10/2004 | Chen |
| 2004/0217794 A1 | 11/2004 | Strysko |
| 2005/0024179 A1 | 2/2005 | Chandrasekaran et al. |
| 2005/0052224 A1 | 3/2005 | Yang et al. |
| 2005/0245658 A1 | 11/2005 | Mehrotra et al. |
| 2005/0254268 A1 | 11/2005 | Reinhard et al. |
| 2005/0281058 A1 | 12/2005 | Batarseh et al. |
| 2006/0006975 A1* | 1/2006 | Jitaru et al. ............... 336/212 |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0237968 A1 | 10/2006 | Chandrasekaran |
| 2006/0255360 A1 | 11/2006 | Brar et al. |
| 2007/0007945 A1 | 1/2007 | King et al. |
| 2007/0045765 A1 | 3/2007 | Brar et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0159857 A1 | 7/2007 | Lee |
| 2007/0222463 A1 | 9/2007 | Qahouq et al. |
| 2007/0241721 A1 | 10/2007 | Weinstein et al. |
| 2007/0296028 A1 | 12/2007 | Brar et al. |
| 2007/0298559 A1 | 12/2007 | Brar et al. |
| 2007/0298564 A1 | 12/2007 | Brar et al. |
| 2008/0024259 A1 | 1/2008 | Chandrasekaran et al. |
| 2008/0054874 A1 | 3/2008 | Chandrasekaran et al. |
| 2008/0074227 A1* | 3/2008 | Chen et al. ............... 336/160 |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0205104 A1 | 8/2008 | Lev et al. |
| 2008/0224812 A1* | 9/2008 | Chandrasekaran ......... 336/212 |
| 2008/0232141 A1 | 9/2008 | Artusi et al. |
| 2008/0298106 A1 | 12/2008 | Tataeishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0046486 A1 | 2/2009 | Lu et al. |
| 2009/0097290 A1 | 4/2009 | Chandrasekaran |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0302986 A1 | 12/2009 | Bedea |
| 2009/0315530 A1 | 12/2009 | Baranwal |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0182806 A1 | 7/2010 | Garrity et al. |
| 2010/0188876 A1 | 7/2010 | Garrity et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0134664 A1 | 6/2011 | Berghegger |
| 2011/0149607 A1 | 6/2011 | Jungreis et al. |
| 2011/0182089 A1 | 7/2011 | Genannt Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| CN | 101335488 A | 12/2008 |
| CN | 201252294 | 6/2009 |
| DE | 10310361 A1 | 9/2004 |
| EP | 0665634 | 9/1995 |
| JP | 57097361 | 6/1982 |
| JP | 58-161308 A * | 9/1983 |
| JP | 3-215911 | 9/1991 |
| JP | 2000-68132 | 3/2000 |
| WO | WO8700991 | 2/1987 |
| WO | 2004042754 A1 | 5/2004 |
| WO | WO 2010/083511 A1 | 7/2010 |
| WO | WO 2010/083514 A1 | 7/2010 |
| WO | WO 2010/114914 A1 | 10/2010 |
| WO | WO 2011/116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET", AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.2, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

(56) References Cited

OTHER PUBLICATIONS

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-integrated Magnetic an Avenue for Higher Power Density and Efficiency in Power Converters" 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters With GaAs VFETs," IEEE 11th Annual Applied Power Electronics Conference and Exposition, Mar. 1996, pp. 264-269, vol. 1, IEEE.

Kuwabara, K., et al., "Switched-Capacitor DC-DC Converters," Fujitsu Limited, IEEE, 1988, Kawasaki, Japan, pp. 213-218.

Lee, P.-W., et al., "Steady-State Analysis of an Interleaved Boost Converter with Coupled Inductors" IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 13, No. 1, IEEE, Los Alamitos, CA.

Maxim, Application Note 725, www.maxim-ic.com/an725, Maxim Integrated Products, Nov. 29, 2001, 8 pages.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

National Semiconductor Corporation, "LMC7660 Switched Capacitor Voltage Converter," www.national.com, Apr. 1997, 12 pages.

National Semiconductor Corporation, "LM2665 Switched Capacitor Voltage Converter," www.national.com, Sep. 2005, 9 pages.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, I., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al., "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems, 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-827, vol. 2, IEEE, Dallas, TX.

Texas Instruments Incorporated, "LT1054, LT1054Y Switched-Capacitor Voltage Converters With Regulators," SLVS033C, Feb. 1990—Revised Jul. 1998, 25 pages.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Vallamkonda, S., "Limitations of Switching Voltage Regulators," A Thesis in Electrical Engineering, Texas Tech University, May 2004, 89 pages.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications" 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

(56) References Cited

OTHER PUBLICATIONS

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Ref. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

* cited by examiner

MAGNETIC DEVICE FORMED WITH U-SHAPED CORE PIECES AND POWER CONVERTER EMPLOYING THE SAME

This application claims the benefit of U.S. Provisional Application No. 61/165,184, entitled "Magnetic Device Formed With U-Shaped Core Pieces and Power Converter Employing The Same," filed on Mar. 31, 2009, which application is incorporated herein by reference.

TECHNICAL FIELD

The present invention is directed, in general, to power electronics and, more specifically, to a magnetic device employable in a power converter.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling the conduction periods of power switches employed therein. Generally, the controllers are coupled between an input and output of the power converter in a feedback loop configuration (also referred to as a "control loop" or "closed control loop").

To produce a dc output voltage, power converters employ magnetic devices such as inductors and transformers. A high-frequency alternating current ("ac") voltage is applied to a winding of the magnetic device that is typically converted to another voltage level by an inductive action of the magnetic device. The converted voltage level is rectified by a diode or an active semiconductor device to produce the dc output voltage.

To produce a high level of power conversion efficiency, magnetic devices are often formed with windings wound in a single layer to reduce the proximity effect produced by high-frequency currents flowing in a proximate winding turn. The proximity effect causes high-frequency currents to flow predominantly in only a portion of a conductive winding, thereby increasing the effective resistance of the winding.

Magnetic devices are conventionally constructed with rectilinear core pieces such as "E" and "I" core pieces employed to form a high-frequency transformer or inductor. From practical manufacturing considerations, such designs require that a single-layer winding be formed on the vertical walls of the "E" portion of the magnetic core. Designs with such winding structures do not utilize the horizontal walls of the "E" or the "I" core pieces of the magnetic core, and accordingly introduce a high level of power losses.

Accordingly, what is needed in the art is a physical structure for a magnetic device and related method that provides a configuration to enable a wider distribution of winding turns to avoid the deficiencies in the prior art.

SUMMARY OF THE INVENTION

These and other problems are generally solved or circumvented, and technical advantages are generally achieved, by advantageous embodiments of the present invention, including a magnetic device formed with U-shaped core pieces employable in a power converter, and a method of forming the same. In one embodiment, the magnetic device includes a rectilinear core piece formed of a magnetic material, and first and second U-shaped core pieces positioned on the rectilinear core piece. The magnetic device also includes first and second conductive windings formed about the first and second U-shaped core pieces, respectively.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a magnetic device including a U-shaped core piece, and a method of forming the same. The magnetic device including a U-shaped core piece provides improved power conversion efficiency by accommodating a larger physical space for turns of a single-layer winding of a conductive material formed thereabout. While the principles of the present invention will be described in the environment of a magnetic device for a power converter, any application that may benefit from a magnetic device such as a power amplifier or a motor controller is well within the broad scope of the present invention.

Figure 1:
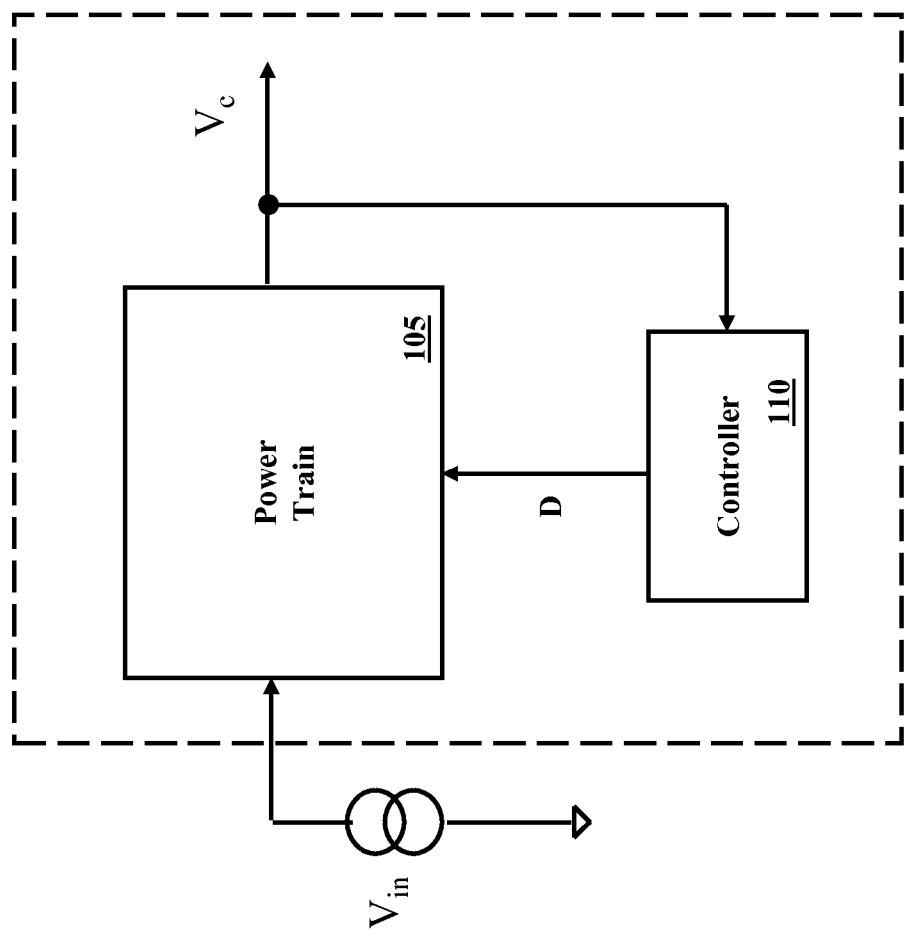
FIG. 1 illustrates a block diagram of an embodiment of a power converter constructed according to the principles of the present invention.

Referring initially to FIG. 1, illustrated is a block diagram of an embodiment of a power converter including a magnetic device constructed according to the principles of the present invention. The power converter is coupled to a source of electrical power such as an ac mains represented by the ac power source providing an input voltage $V_{in}$. The power converter includes a power train 105 that is controlled by a controller 110. The controller 110 generally measures an operating characteristic of the power converter such as an output voltage $V_c$ and controls a duty cycle D of one or more power switches therein in response to the measured operating characteristic to regulate the characteristic. The power converter may form a section of a power supply and provide power to another subsystem thereof, such as an isolating dc-dc power converter coupled to an output thereof that provides a regulated voltage to a load. The power train 105 may employ a boost topology as described herein. The power train 105 of the power converter includes a plurality of power switches coupled to a magnetic device to provide the power conversion function.

Figure 2:
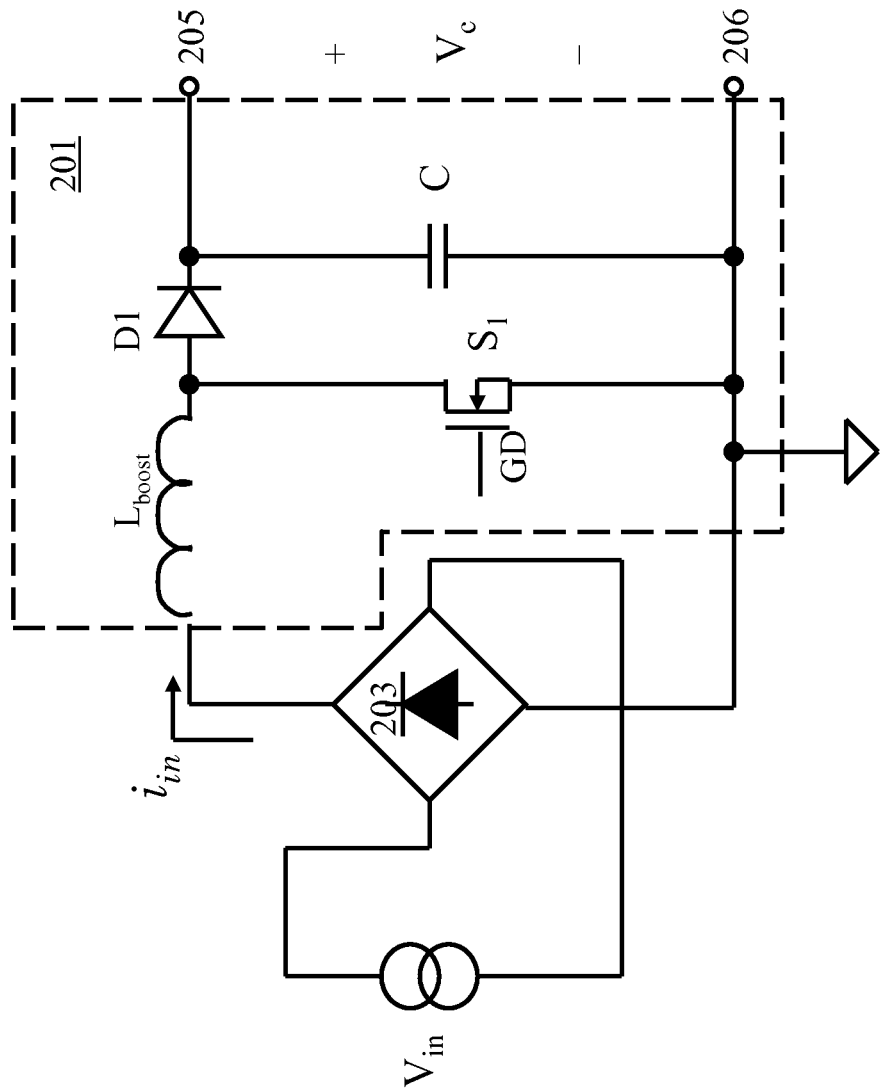
FIGS. 2 to 4 illustrate schematic diagrams of exemplary power trains employable in a power converter constructed according to the principles of the present invention.

Turning now to FIG. 2, illustrated is a schematic diagram of an exemplary power train (including a boost topology) 201 employable in a power converter constructed according to the principles of the present invention. The power train 201 of the power converter receives an input voltage $V_{in}$ (e.g., an unregulated ac input voltage) from a source of electrical power such as ac mains at an input thereof and provides a regulated output voltage $V_C$ at output terminals 205, 206 of the power converter. In keeping with the principles of a boost topology, the output voltage $V_C$ is generally higher than the input voltage $V_{in}$ such that a switching operation thereof can regulate the output voltage $V_C$. A main power switch $S_1$, (e.g., an N-channel metal-oxide semiconductor ("NMOS") active switch or switch) is enabled to conduct by a gate drive signal GD for a primary interval and couples the input voltage $V_{in}$ through a rectifier bridge 203 to a boost inductor $L_{boost}$. During a primary interval D, an input current $i_{in}$ increases and flows through the boost inductor $L_{boost}$ to local circuit ground. The boost inductor $L_{boost}$ is generally formed with a single-layer winding to reduce the proximity effect to increase the efficiency of the power converter.

The duty cycle for the power train 201 depends in steady state on the ratio of the input and output voltages $V_{in}$, $V_c$, respectively, according to the equation:

$$D = 1 - \frac{V_{in}}{V_c}.$$

During a complementary interval 1-D, the main power switch $S_1$ is transitioned to a non-conducting state and an auxiliary power switch (e.g., the diode D1) conducts. In an alternative circuit arrangement, the auxiliary power switch D1 may include a second active power switch that is controlled to conduct by a complementary gate drive signal. The auxiliary power switch D1 provides a path to maintain the continuity of the input current $i_{in}$ flowing through the boost inductor $L_{boost}$. During the complementary interval 1-D, the input current $i_{in}$ flowing through the boost inductor $L_{boost}$ decreases, and may become zero and remain zero for a period of time resulting in a "discontinuous conduction mode" of operation.

During the complementary interval 1-D, the input current $i_{in}$ flowing through the boost inductor $L_{boost}$ flows through the diode D1 (i.e., the auxiliary power switch) into an output filter capacitor C. In general, the duty cycle of the main power switch $S_1$ (and the complementary duty cycle of the auxiliary power switch D1) may be adjusted to maintain a regulation of the output voltage $V_C$ of the power converter. Those skilled in the art understand that conduction periods for the main and auxiliary power switches $S_1$, D1 may be separated by a small time interval by the use of "snubber" circuit elements (not shown) or by control circuit timing to avoid cross conduction current therebetween, and beneficially to reduce the switching losses associated with the power converter. Circuit and control techniques to avoid cross conduction currents between power switches are well understood in the art and will not be described further in the interest of brevity. The boost inductor $L_{boost}$ is preferably formed with a single-layer winding as described previously hereinabove to reduce power loss associated with the proximity effect.

Figure 3:
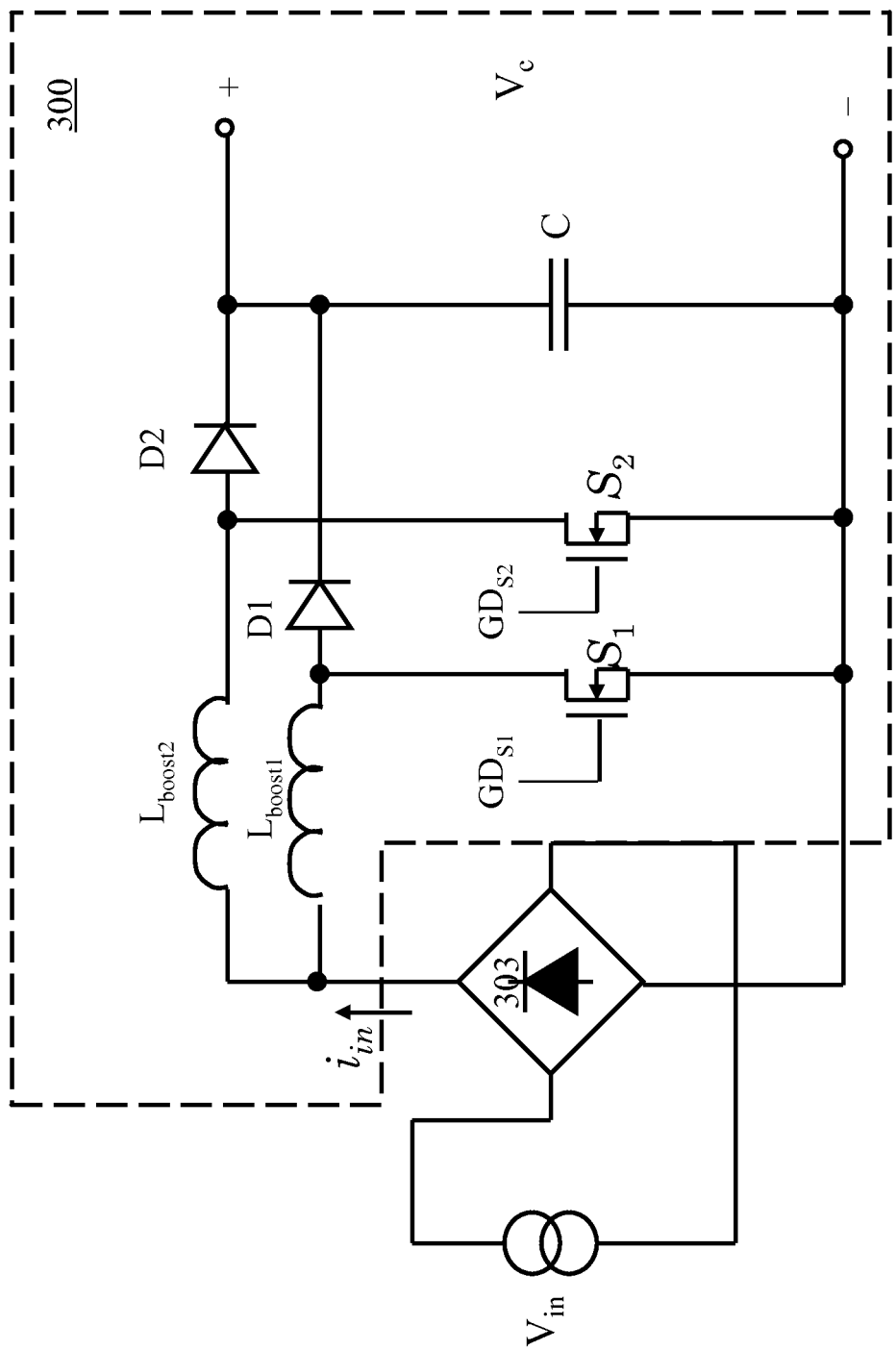

Turning now to FIG. 3, illustrated is a schematic diagram of an exemplary power train (including a boost topology) 300 employable in a power converter constructed according to the principles of the present invention. The power train 300 includes a first boost regulator subcircuit including a first boost inductor $L_{boost1}$, a first diode D1, and a first power switch $S_1$ that receives a first drive signal $GD_{S1}$. The power train 300 includes a second boost regulator subcircuit including a second boost inductor $L_{boost2}$, a second diode D2, and a second power switch $S_2$ that receives a second drive signal $GD_{S2}$. The first and second boost regulator subcircuits are generally controlled to operate roughly 180 degrees out of phase with respect to each other. Out-of-phase operation of the boost regulator subcircuits provides an interleaving effect that doubles the ripple frequency and reduces the ripple magnitude for the current drawn from a rectifier bridge 303 and hence an ac input current $i_{in}$. A similar effect is achieved for the current supplied to the output filter capacitor C. The reduction of switching ripple magnitude in the input current $i_{in}$ helps reduce filtering requirements for an input filter (not shown) to reduce undesirable high-frequency components that may be conducted back to a source of electrical power such as an ac mains. Substantial benefits accrue from the interleaving effects between the two boost regulator subcircuits. The first and second boost inductors $L_{boost1}$, $L_{boost2}$ are formed with single-layer windings in a magnetic structure. Remaining circuit elements in FIG. 3 and in following FIGUREs that are similar to those in FIG. 2 and will not be described again in the interest of brevity.

Figure 4:
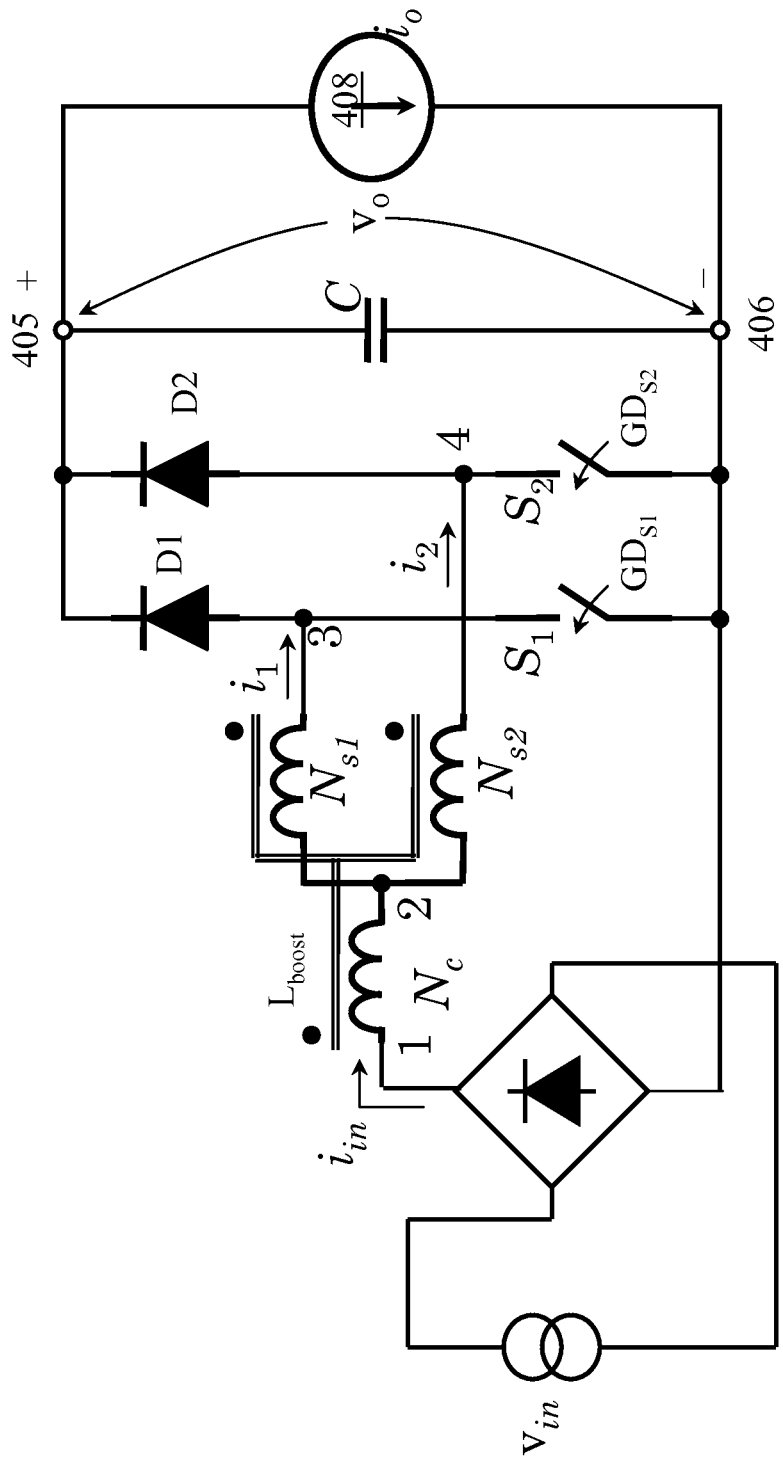

Turning now to FIG. 4, illustrated is a schematic diagram of an exemplary power train employable in a power converter constructed according to the principles of the present invention. More specifically, the power train employs a boost topology with two interleaved boost regulator subcircuits and a boost inductor $L_{boost}$ formed by a magnetic device. The magnetic device includes a common conductive winding or winding $N_C$ (coupled between terminals 1 and 2 of the magnetic device), a first conductive winding or winding $N_{S1}$ (coupled between terminals 2 and 3), and a second conductive winding or winding $N_{S2}$ (coupled between terminals 2 and 4). The first and second windings $N_{S1}$, $N_{S2}$ are electrically and magnetically coupled to the common winding $N_C$. In an exemplary embodiment, the first and second windings $N_{S1}$, $N_{S2}$ have equal numbers of turns and will hereinafter be represented with a reference symbol $N_S$. Dots are illustrated in FIG. 4 adjacent to the windings to indicate the sense of each winding (i.e., the winding direction and the sense of the magnetically induced voltage therein).

In an exemplary embodiment, the interleaved boost regulator subcircuits are controlled by a control circuit or controller (not shown) to provide an input current with high-power factor. One boost regulator subcircuit includes a first diode D1 and a first power switch $S_1$, and a portion of the magnetic device that includes the common winding $N_c$ and the first winding $N_{S1}$. The other boost regulator subcircuit includes a second diode D2 and a second power switch $S_2$, and a portion of the magnetic device that includes the common winding $N_c$ and the second winding $N_{S2}$. The output currents $i_1$, $i_2$ from the boost regulator subcircuits of the power train are interleaved and flow through the first and second diodes D1, D2, respectively, into an output filter capacitor C. Similarly, the input currents to the boost regulator subcircuits are interleaved and form the input current $i_{in}$, through the common winding $N_c$. The first and second power switches $S_1$, $S_2$ are controlled by first and second control signals $GD_{S1}$, $GD_{S2}$, respectively, to provide duty-cycle control for each of the two interleaved boost regulator subcircuits. The first and second control signals $GD_{S1}$, $GD_{S2}$ may be controlled 180 degrees out of phase with respect to each other, and provide a common duty cycle D for each boost regulator subcircuit. A load, represented by current source 408 is coupled to output terminals 405, 406 of the power converter and draws an output current $i_o$.

A common winding $N_C$ with selected turns has been described herein as being formed around a center leg of a magnetic core of the magnetic device. In an alternative embodiment, the common winding $N_C$ with selected turns may be formed around a common leg of a magnetic core that is not geometrically a center leg. Thus, the terms "center" and "common" as illustrated and used herein with reference to a leg of a magnetic core have a similar meaning, and include a leg of a magnetic core that may not be geometrically located as a center leg.

Figure 5:
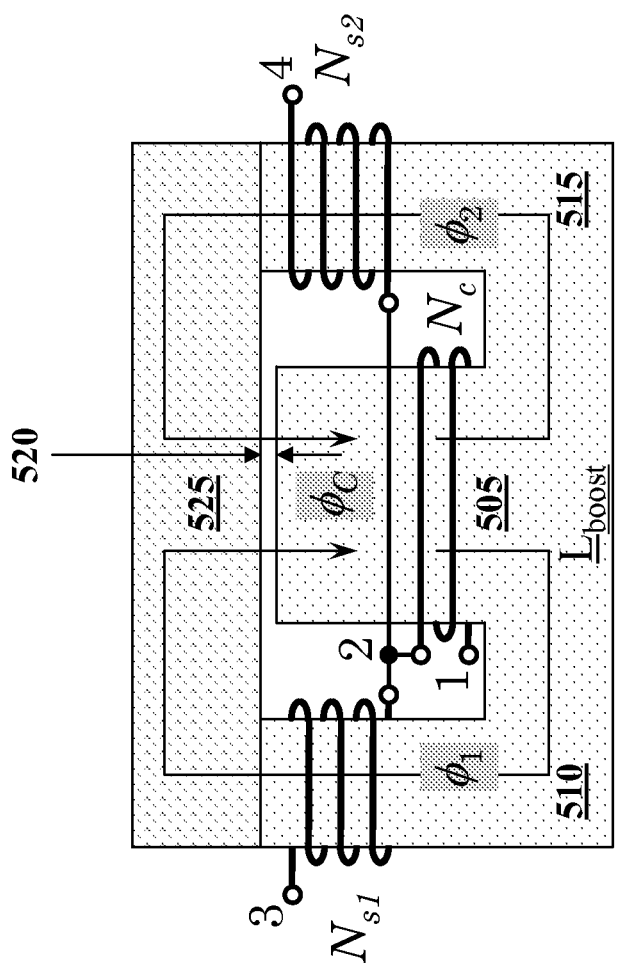
FIGS. 5 to 9 illustrate diagrams of embodiments of magnetic devices constructed according to the principles of the present invention.

Turning now to FIG. 5, illustrated is a diagram of an embodiment of a magnetic device constructed according to the principles of the present invention. The magnetic device is a boost inductor $L_{boost}$ with rectilinear construction and with single-layer windings. The magnetic device includes the common winding $N_c$ wound around a common leg 505 of the magnetic core, which may be a center leg of the magnetic core, and be electrically and magnetically coupled to first and second windings $N_{S1}$, $N_{S2}$, each formed in a single layer, and each wound around separate legs (e.g., first and second outer legs 510, 515, respectively) of the magnetic core. A common flux $\phi_c$ flows through the common leg 505 of the magnetic core. First and second fluxes $\phi_1$, $\phi_2$ flow through the first and second outer legs 510, 515, respectively, of the magnetic core. The first and second windings $N_{S1}$, $N_{S2}$ are each conventionally formed as a single layer on the vertical walls of the "E" portion of the magnetic core, which limits the electrical conductivity of these windings.

Terminals 1, 2, 3, and 4 of the magnetic device illustrated in FIG. 5 correspond to terminals similarly numbered and described with reference to FIG. 4. In the embodiment of the magnetic device illustrated in FIG. 5, a gap 520 (e.g., an air gap or a gap of other substantially nonmagnetic material) is formed between an upper surface of the common leg 505 and a lower surface of an upper cross-member 525 of the magnetic core. In an alternative embodiment, gaps, preferably of equal length, can be formed between the upper surfaces of the first and second outer legs 510, 515 and/or the lower surface of the upper cross-member 525. In further embodiments, gaps, not all necessarily of equal length, can be formed between upper surfaces of all the legs 505, 510, 515 and the lower surface of the upper cross-member 525. The sense of the winding directions is illustrated by the drawings of the windings $N_C$, $N_{S1}$, $N_{S2}$ in FIG. 5. Of course, the sense of all the windings $N_C$, $N_{S1}$, $N_{S2}$ can be reversed to produce the same result, but with magnetic fluxes flowing in opposite directions. In a further alternative embodiment of a magnetic device, the first and second windings $N_{S1}$, $N_{S2}$ can be electrically coupled together external to the magnetic device. In a further alternative embodiment of a magnetic device, the common winding $N_C$ can be separated into two winding parts that can be electrically coupled together external to the magnetic device.

Figure 6:
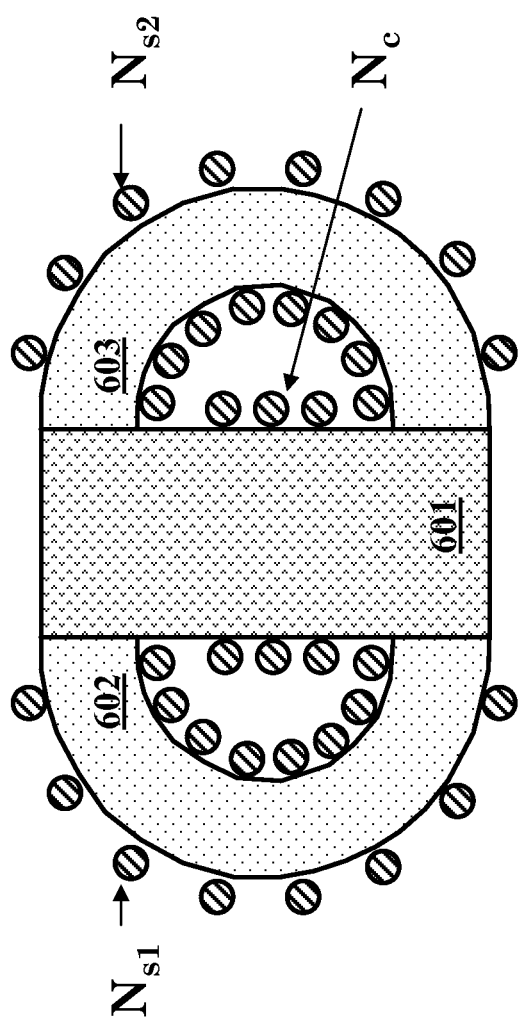

Turning now to FIG. 6, illustrated is a diagram of an embodiment of a magnetic device constructed according to the principles of the present invention. The magnetic device includes first and second U-shaped core pieces 602, 603, separated by a rectilinear core piece or central rectilinear core piece 601 (formed of a magnetic material). The first and second U-shaped core pieces 602, 603 form a portion of a toroidal core and are preferably formed of high permeability magnetic material, such as a soft ferrite. The conductive windings, such as first and second conductive windings or windings $N_{s1}$, $N_{s2}$, are each formed about, along substantially the full span or substantially an entire curved length of the first and second U-shaped core pieces 602, 603, respectively. A third conductive winding or winding (e.g., a common or center conductive winding) $N_c$ is formed about the rectilinear core piece 601, and is electrically coupled to said first and second conductive windings $N_{s1}$, $N_{s2}$. The magnetic device illustrated herein integrates and couples three inductors into one magnetic device.

Figure 7:
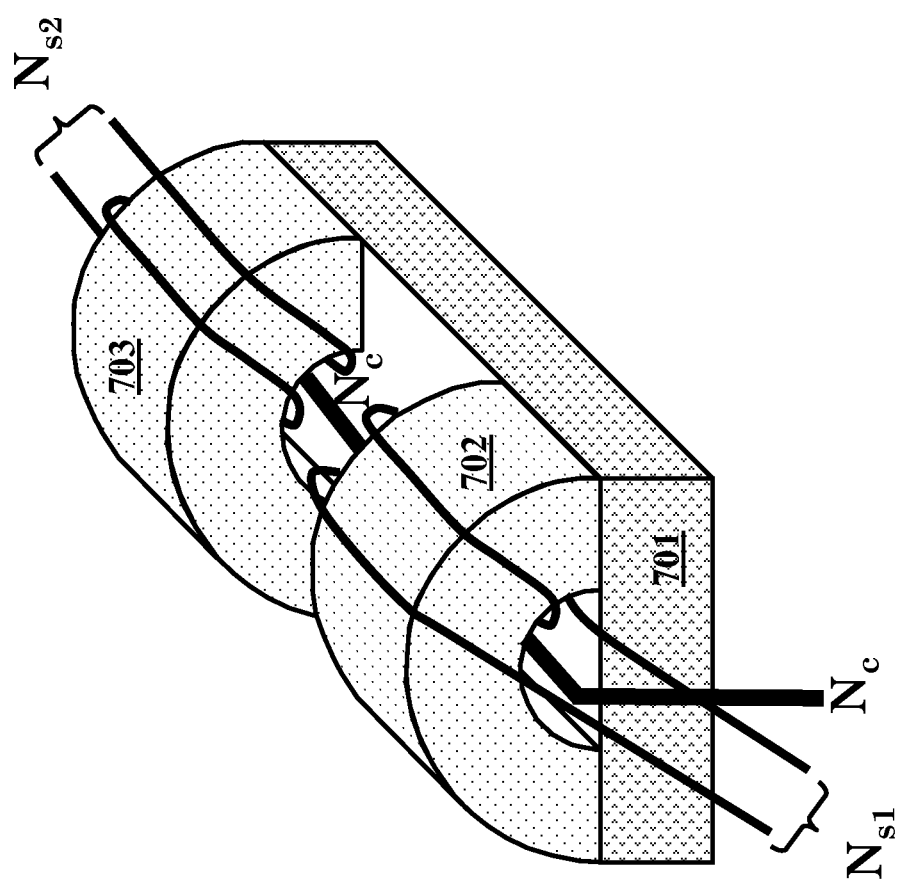

Turning now to FIG. 7, illustrated is a diagram of an embodiment of a magnetic device constructed according to the principles of the present invention. The magnetic device includes first and second U-shaped core pieces 702, 703. The first and second U-shaped core pieces 702, 703 are now positioned on a common surface of a rectilinear core piece or central rectilinear core piece 701. The first and second U-shaped core pieces 702, 703 are again preferably formed of high permeability magnetic material, such as a magnetic material with a relative permeability greater than 50. For example, and without limitation, the first and second U-shaped core pieces 702, 703 may be formed of a soft ferrite. The first and second conductive windings or windings $N_{s1}$, $N_{s2}$, may each be formed about or along substantially the full span of the first and second U-shaped core pieces 702, 703, respectively. To simplify the drawing illustrated in FIG. 7, the first and second conductive windings $N_{s1}$, $N_{s2}$ are illustrated spanning only a portion of the first and second U-shaped core pieces 702, 703, respectively. A third conductive winding or winding (e.g., a common or center conductive winding) $N_c$, which may be formed as a staple, is again formed about the rectilinear core piece 701.

As indicated illustrated in FIG. 5, the center leg 505 of the magnetic device includes a gap or low-permeability "spacer" 520 in which a substantial portion of the magnetic energy of the magnetic device is stored. In order to reduce mismatch of magnetic flux in the first and second U-shaped core pieces of FIGS. 6 and 7 due to currents flowing in the first and second conductive windings $N_{s1}$, $N_{s2}$, respectively, gaps may be included in the flux paths of the outer legs formed by the first and second U-shaped core pieces. A gap can be formed, without limitation, of a nonmagnetic material or a magnetic material of low permeability such as air, a plastic material, or a powdered soft ferrite distributed in a nonmagnetic matrix such as a resin or an epoxy.

Figure 8:
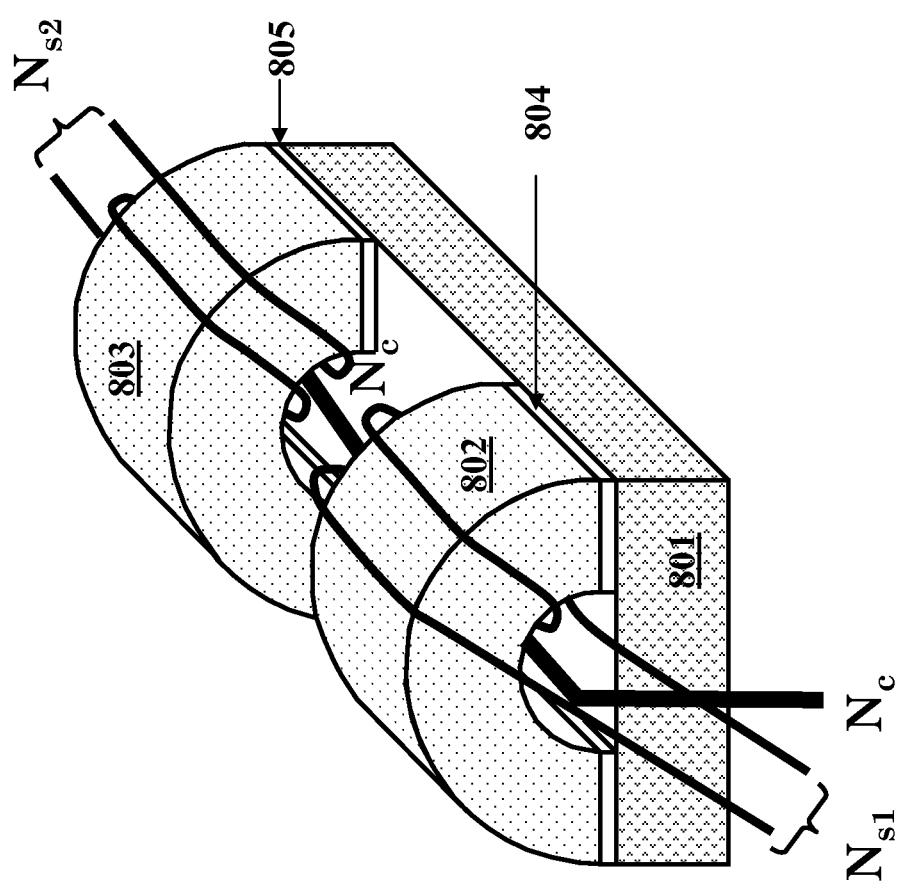

Turning now to FIG. 8, illustrated is a diagram of an embodiment of a magnetic device constructed according to the principles of the present invention. The magnetic device includes first and second U-shaped core pieces 802, 803 positioned on a common surface of the rectilinear core piece or central rectilinear core piece 801. First and second gaps 804, 805, which may be formed of nonmagnetic spacers, are positioned between the first and second U-shaped core pieces 802, 803, respectively, and the rectilinear core piece 801 to reduce mismatch of magnetic flux in the first and second U-shaped core pieces 802, 803 due to currents flowing in first and second conductive windings $N_{s1}$, $N_{s2}$. Again, a third conductive winding or winding (e.g., a common or center conductive winding) $N_c$ is formed about the rectilinear core piece 801.

Figure 9:
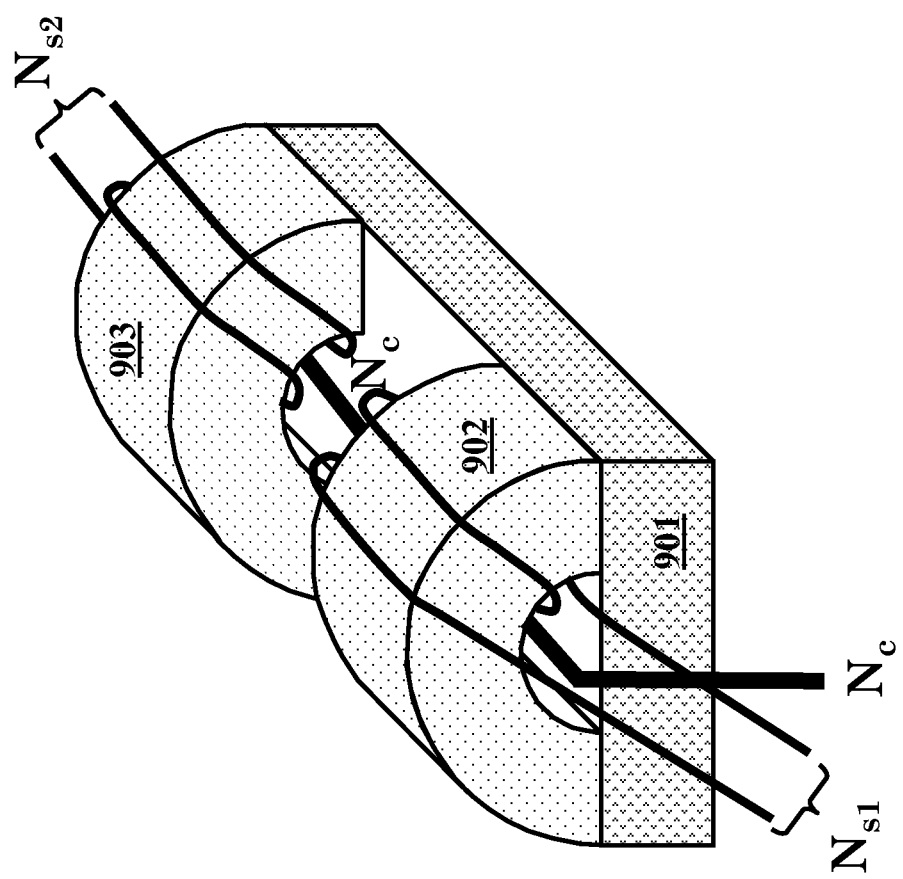

Turning now to FIG. 9, illustrated is a diagram of an embodiment of a magnetic device constructed according to the principles of the present invention. The magnetic device includes first and second U-shaped core pieces 902, 903 positioned on a common surface of a rectilinear core piece or central rectilinear core piece 901. The rectilinear core piece 901 is constructed of magnetic material with a distributed gap. In other words, it is constructed of a magnetic material with a lower relative permeability than the relative permeability of the first and second U-shaped core pieces 902, 903, such as a powdered soft ferrite distributed in a nonmagnetic matrix such as a resin or an epoxy. In this manner, a gap is formed in series with flux flowing in a common or center leg (e.g., the rectilinear core piece 901) of the magnetic structure, as well as gaps formed in series with flux flowing in the outer legs (e.g., the first and second U-shaped core pieces 902, 903). Such use of disparate magnetic materials, such as a higher relative magnetic permeability of the first and second U-shaped core pieces 902, 903 compared to the relative magnetic permeability of the rectilinear core piece 901, enables construction of a magnetic structure without the need to insert physical spacers to produce series low-permeability gaps, and without the need to accurately shorten the center or common leg of an "E" core piece to produce a series air gap for a flux flowing therein, thereby reducing a manufacturing cost.

Thus, a magnetic device including a U-shaped core piece, and a method of forming the same has been introduced herein. In one embodiment, the magnetic device includes a rectilinear core piece formed of a magnetic material. The rectilinear core piece may be formed with a distributed air gap. The magnetic device also includes first and second U-shaped core pieces formed of a high relative permeability magnetic material and positioned on the rectilinear core piece. The first and second U-shaped core pieces may be positioned on a common surface of the rectilinear core piece, and may form a portion of a toroidal core. A nonmagnetic spacer may be positioned between one of the first and second U-shaped core pieces and a surface of the rectilinear core piece. Typically, a relative permeability of the rectilinear core piece is substantially lower than the relative permeability of the first and second U-shaped core pieces.

The magnetic device also includes first and second conductive windings formed about the first and second U-shaped core pieces, respectively. The first and second conductive windings may be formed over substantially an entire curved length of the first and second U-shaped core pieces, respectively. The magnetic device may also include a third conductive winding (e.g., a common or center conductive winding, or as a staple) formed about the rectilinear core piece, and electrically coupled to the first and second conductive windings.

Those skilled in the art should understand that the previously described embodiments of a power converter including a magnetic device including U-shaped core pieces positioned on a rectilinear core piece and related methods of forming the same are submitted for illustrative purposes only. While a magnetic structure has been described in the environment of a power converter, the magnetic structure may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A magnetic device, comprising:
a rectilinear core piece formed of a magnetic material;
first and second U-shaped core pieces with a bottom surface of ends thereof positioned on a common surface of said rectilinear core piece, a relative permeability of said rectilinear core piece being substantially lower than a relative permeability of said first and second U-shaped core pieces;
first and second conductive windings formed about said first and second U-shaped core pieces, respectively; and
a third conductive winding formed about said rectilinear core piece and electrically coupled to said first and second conductive windings at a common terminal.

2. The magnetic device as recited in claim 1 wherein said first and second conductive windings are formed over substantially an entire curved length of said first and second U-shaped core pieces, respectively.

3. The magnetic device as recited in claim 1 wherein said first and second U-shaped core pieces are formed with a soft ferrite.

4. The magnetic device as recited in claim 1 further comprising a nonmagnetic spacer positioned between said bottom surface of said ends of at least one of said first and second U-shaped core pieces and said common surface of said rectilinear core piece.

5. The magnetic device as recited in claim 1 wherein said first and second U-shaped core pieces are separated by a portion of said common surface of said rectilinear core piece.

6. The magnetic device as recited in claim 1 wherein said third conductive winding is formed as a staple.

7. The magnetic device as recited in claim 1 wherein said first and second conductive windings are formed as a single layer about said first and second U-shaped core pieces, respectively.

8. The magnetic device as recited in claim 1 wherein said rectilinear core piece is formed with a distributed gap.

9. The magnetic device as recited in claim 1 wherein said first and second conductive windings are first and second secondary windings and said third conductive winding is a common winding coupled thereto.

10. The magnetic device as recited in claim 1 wherein said first and the second U-shaped core pieces are each formed as a portion of a toroidal core.

11. A method of forming a magnetic device, comprising:
providing a rectilinear core piece of a magnetic material;
positioning a bottom surface of ends of first and second U-shaped core pieces on a common surface of said rectilinear core piece, a relative permeability of said rectilinear core piece being substantially lower than a relative permeability of said first and second U-shaped core pieces;
forming first and second conductive windings about said first and second U-shaped core pieces, respectively; and
forming a third conductive winding about said rectilinear core piece and electrically coupled to said first and second conductive windings at a common terminal.

12. The method as recited in claim 11 wherein said first and second conductive windings are formed over substantially an entire curved length of said first and second U-shaped core pieces, respectively.

13. The method as recited in claim 11 wherein said first and second U-shaped core pieces formed with a soft ferrite.

14. The method as recited in claim 11 further comprising positioning a nonmagnetic spacer between said bottom surface of said ends of at least one of said first and second U-shaped core pieces and said common surface of said rectilinear core piece.

15. The method as recited in claim 11 wherein said first and second U-shaped core pieces are separated by a portion of said common surface of said rectilinear core piece.

16. The method as recited in claim 11 wherein said third conductive winding is formed as a staple.

17. The method as recited in claim 11 wherein said first and second conductive windings are formed as a single layer about said first and second U-shaped core pieces, respectively.

18. The method as recited in claim 11 wherein said rectilinear core piece is formed with a distributed gap.

19. The method as recited in claim 11 wherein said first and second conductive windings are first and second secondary windings and said third conductive winding is a common winding coupled thereto.

20. The method as recited in claim 11 wherein said first and the second U-shaped core pieces are each formed as a portion of a toroidal core.

* * * * *